(12) United States Patent
Alexander, III et al.

(10) Patent No.: US 6,779,103 B1
(45) Date of Patent: Aug. 17, 2004

(54) CONTROL WORD REGISTER RENAMING

(75) Inventors: William Alexander, III, Hillsboro, OR (US); Darrell D. Boggs, Aloha, OR (US); Mehul Dave, Bellevue, WA (US)

(73) Assignee: Intel Corporation, Santa Clara, CA (US)

( * ) Notice: Subject to any disclaimer, the term of this patent is extended or adjusted under 35 U.S.C. 154(b) by 608 days.

(21) Appl. No.: 09/676,550

(22) Filed: Sep. 29, 2000

(51) Int. Cl.$^7$ ................................................ G06F 9/38
(52) U.S. Cl. ...................... 712/217; 712/222; 712/228
(58) Field of Search ............................... 712/217, 216, 712/222, 228

(56) References Cited

U.S. PATENT DOCUMENTS 5,781,753 A     7/1998    McFarland et al.
5,826,070 A * 10/1998    Olson et al. ................. 712/222
5,951,670 A     9/1999    Glew et al.
5,974,525 A    10/1999    Lin et al.
5,978,900 A    11/1999    Liu et al.

OTHER PUBLICATIONS

Intel Corporation, "IA–32 Intel Architecture Software Developer's Manual with Preliminary Willamette Architecture Information," vol. 1: Basic Architecture; 2000.

U.S. patent application Ser. No. 09/472,840; filed Dec. 28, 1999; Clift et al.

* cited by examiner

*Primary Examiner*—William M. Treat
(74) *Attorney, Agent, or Firm*—Blakely, Sokoloff, Taylor & Zafman LLP (57) ABSTRACT

A control word register, which is specified in a load control word instruction, is renamed and mapped into one of a plurality of physical control word registers. The renaming is performed by a rename logic, which allows for more than one physical control word register to be available for an instruction specifying a given logical control word register.

26 Claims, 7 Drawing Sheets

FLDCW

0

↓ ↓

1 fp_test_fcw

↓

1 conditional jump if ZF=1 ⟶ EOM

↓

1 SET

1 READ 1 new_fcw

↓

1 SET

1 READ

1 EOM

CONTROL WORD REGISTER RENAMING

BACKGROUND OF THE INVENTION

1. Field of the Invention

The present invention relates to the field of processors and more particularly, to a technique for renaming a control word register.

2. Description of the Related Art

In a computer system, a processor operates by responding to program instructions in which microarchitecture op-codes ($\mu$ops), also referred to as machine instructions, control how the processor circuitry responds to the decoded instructions. In some processors, such as processors within the Intel Architecture Family of Processors (which includes the Pentium® processor, manufactured by Intel Corporation of Santa Clara, Calif.), utilize a control word to program how the processor responds to certain instructions. For example, many of the processors of the Intel Architecture Family utilize a separate integer execution unit and a floating point execution unit. In the floating point unit (FPU), a control word register stores a floating point control word (FCW). The FCW value placed in the floating point control word register determines how the floating point unit executes certain instructions. Rounding and precision are two operations which are controlled by the FCW.

In one class of processors of the Intel Architecture Family of Processors, a 16-bit FCW resides in a 16-bit floating point control word register, in which two bits are utilized to control the precision of the floating point operation (such as determining single precision or double precision operation for the data in the floating point registers) and two bits are utilized to control the rounding (such as rounding up, rounding down, or truncating the excess digits). Thus, the FCW value in the FCW register controls how the processor manages the rounding and precision when operating on data in the floating point registers.

Prior art practice utilizes a single FCW register in the floating point unit to control the FPU. Generally, a floating point load control word instruction (FLDCW) is utilized to load the FCW register. Subsequently, $\mu$ops will then cause the processor to operate based on the value of the FCW stored in the FCW register. If, any of the parameters controlled by the current FCW are to be changed, (such as changing the rounding and/or precision), a new FCW value will need to be loaded into the FCW register using the FLDCW instruction. Generally, an FLDCW instruction requires existing pops presently executing in the machine to be completed, before the new FCW value is placed in the FCW register.

One repetitive operation that is used consistently in many processors of the Intel Architecture Family of Processors is the conversion of floating point data to integer data. That is, floating point operations are performed on data in the floating point unit and then converted to integer format for integer operations. In this operation, typically a subroutine is called to convert the floating point value to the integer value. Each time a floating point to integer operation conversion is performed, a new FCW value is typically required in the FCW register since the precision and/or the rounding procedure changes for the different formats. In some instances, after the conversion to integer format, the FCW register needs to be reloaded again with the original FCW to continue operating on floating point data with the proper rounding and precision control. Each time the FCW register is reloaded, an appreciable amount of processor stalling is required since a new FCW value cannot be loaded until all pops requiring the old FCW have completed executing.

The present invention addresses this aspect of the floating point control word register.

DETAILED DESCRIPTION OF THE INVENTION

Figure 1:
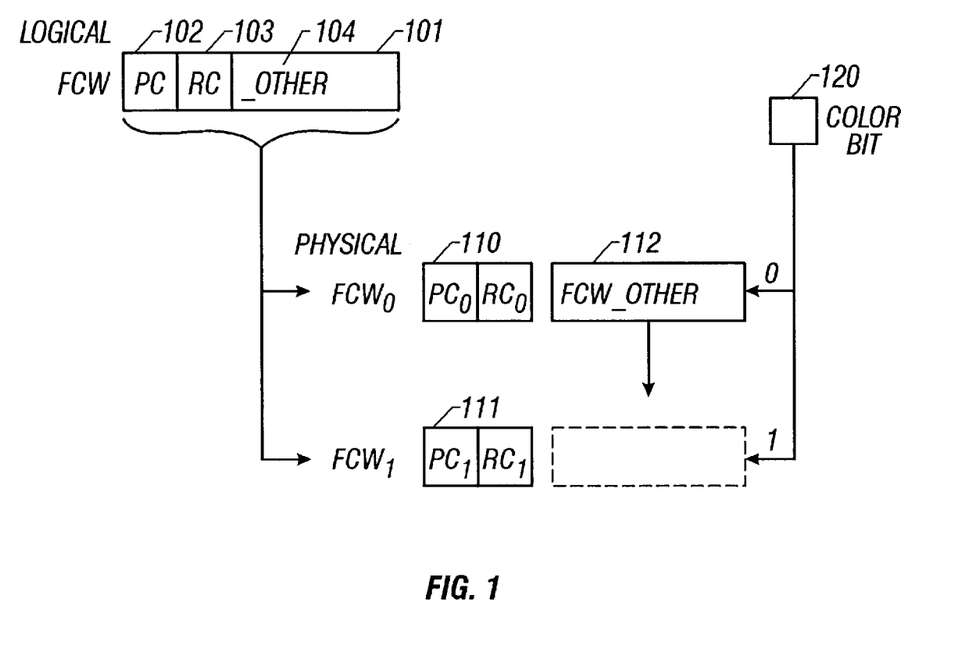
FIG. 1 illustrates a virtual floating point control word (FCW) register configuration in which renamed FCW registers are provided and selected by the use of a color bit.

Referring to FIG. 1, an embodiment of the invention in which the floating point control word is mapped into renamed physical FCW registers. That is, an instruction which loads a floating point control word into a logical floating point control word register 101 is renamed so that it can be mapped into more than one physical register. The particular example illustrated in FIG. 1 pertains to a group of processors of the Intel Architecture Family of Processors in which a floating point control word (FCW) is specified to be loaded into a control word register, when a floating point load control word (FLDCW) instruction is executed. The FLDCW instruction fetches an FCW from a storage location, such as from a memory location, and loads the FCW into the FCW register 101. The FCW includes precision control (PC) bits 102, rounding control (RC) bits 103 as well as other control bits 104 for controlling operations performed on various designated registers.

In one embodiment, the FCW is 16 bits in length and the PC bits 102 and RC bits 103 are each two bits in length. In the example illustration of FIG. 1, the remaining bits 104 are noted as FCW_OTHER. The FCW register renaming scheme shown in FIG. 1 is used to allow more than one PC and RC (PC/RC) values to be loaded and made available to the processor. It is to be noted that the particular example utilizes a 16-bit FCW, but that the exact number of bits can vary. Thus 32-bit, 64-bit and 128-bit FCW's are other examples. Furthermore, although the control word in the examples are floating point control words, the invention need not be limited to floating point.

As shown in FIG. 1, three registers, 110, 111 and 112 are utilized for the renaming of the logical FCW register 101. In the particular embodiment illustrated in FIG. 1, only the PC and RC bits 102 and 103 are renamed. Thus, physical register 110 holds the first PC and RC values (noted as $PC_0$ and $RC_0$) and the second register 111 is used to hold the second set of PC/RC values (noted as $PC_1$ and $RC_1$). The $PC_0/RC_0$ in register 110 are referred to as $FCW_0$ and the $PC_1/RC_1$ in register 111 are referred to as $FCW_1$. The third register 112 holds the remaining FCW_OTHER bits 104 of the logical FCW. Accordingly, as shown in FIG. 1, the logical FCW register 101 is mapped to two renamed FCW registers, noted as $FCW_0$+FCW_OTHER and $FCW_1$+FCW_OTHER. The renamed FCW registers essentially provide a virtual FCW for the processor and FIG. 1 illustrates the use of two FCWs.

Figure 6:
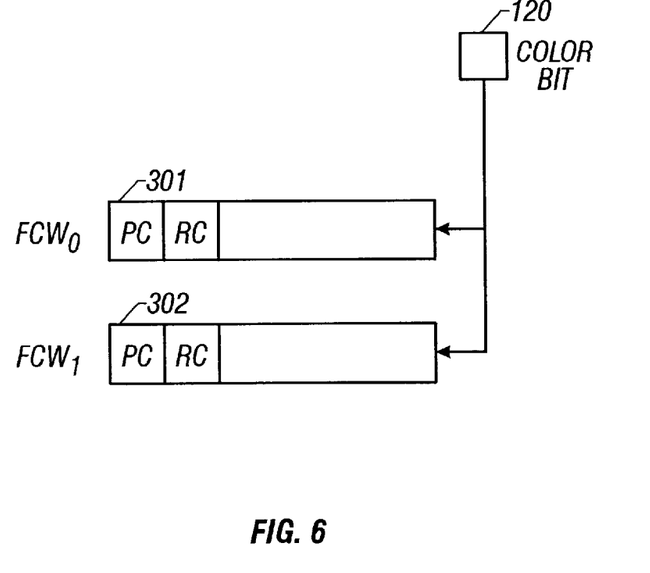
FIG. 6 is an alternative embodiment of FIG. 1 in which two completely renamed FCW registers are utilized.

It is appreciated that the register configuration could be designed to hold two completely separate sets of renamed registers, as shown in the example embodiment of FIG. 6. However, since a high percentage of the FLDCW operation is performed for the purposes of changing the PC and/or the RC control bits only (the other remaining bits 104 are typically not changed), the implementation shown in FIG. 1 effectively provides the necessary function with less register area on an integrated circuit.

A state selection bit or state bit (also referred to as a color bit) 120 is utilized to select between $FCW_0$ and $FCW_1$. That is, effectively, the color bit 120 provides the mechanism for selecting either physical register 110 or 111. Thus, the bit value of the color bit 120 selects between $FCW_0$ and $FCW_1$. In the example shown in FIG. 1, a color bit state of "0" selects $FCW_0$ and bit state "1" selects $FCW_1$. If additional physical registers were utilized, then additional selection bits could be incorporated to select among the renamed FCW registers. For example, if there were three or four renamed $FCW_x$ registers, then two selection bits could be utilized to select the appropriate renamed $FCW_x$ register.

Figure 2:
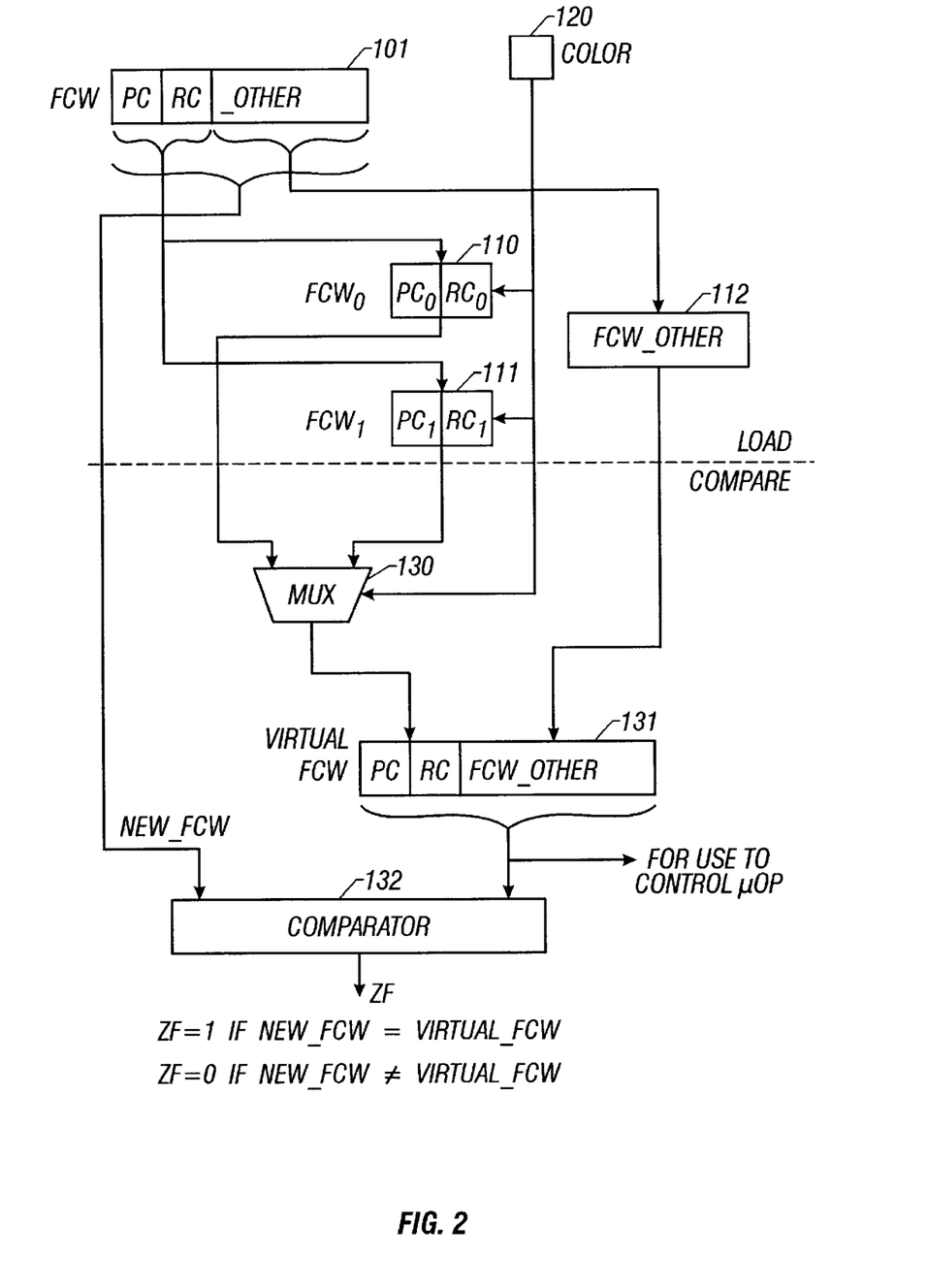
FIG. 2 is a block diagram illustrating the loading of the renamed FCW registers and the selection of the proper renamed FCW register by the use of the color bit.

The operation of the renamed FCW registers is illustrated in more detail in FIG. 2. When a first floating point control word is to be loaded by executing a load floating point control word instruction, such as the earlier described FLDCW instruction, the selection bit sets the color (selection) to select between registers 110 and 111. In the example, if the color bit has a value of "0", then the PC and RC values of the FCW 101 are loaded into register 110. Subsequently, when the next FCW load instruction is encountered, the selection bit flips its state (in the example the color bit flips its state from "0" to "1"). The color change of the selection bit 120 now selects register 111 so that the PC/RC components of the second FCW is stored in register 111 as $FCW_1$. The other bits (FCW_OTHER) are presumed to be the same for this example. Thus, two logical floating point control words are mapped to two renamed registers in which the two are differentiated by the color bit 120. The section noted above the dotted line in FIG. 2 (section noted as "load") provides for remapping the logical FCW to a physical $FCW_x$.

Once the PC/RC bits are stored, whenever subsequent FLDCW instructions are encountered in a program, each FLDCW instruction causes the color bit to flip (from "0" to "1"; or "1" to "0"), so that the two registers 110, 111 alternate in accepting the new PC/RC values with subsequent FLDCW instructions. In executing instructions which utilize a particular control register, the color of a given μop determines if $FCW_0$ or $FCW_1$ is the correct $FCW_x$ register. That is, when the processor executes a μop, the PC/RC control bits of $FCW_0$ or the PC/RC control bits of $FCW_1$ will be selected depending on the color bit assigned to that particular μop. As will be shown in the subsequent figures, each μop (or machine instruction) is associated with a color so that its color is used to determine which of the renamed FCW registers will be utilized as the control register for that μop.

How this is achieved is shown by the region below the dotted line (section noted as "compare") noted in FIG. 2. The PC/RC output bits from registers 110 and 111 are coupled to a multiplexer (mux) 130, in which the color bit is used to determine which input will be selected for output from the mux 130. The selected PC/RC bits are then combined with the FCW_OTHER bits to form a virtual FCW 131. Thus, the virtual FCW 131 is the combination of FCW_OTHER in combination with either $FCW_0$ or $FCW_1$. The selection as to which $FCW_x$ will be used is determined by the color of the μop.

FIG. 2 also illustrates what happens when a subsequent new logical FCW (NEW_FCW) is loaded by the next FLDCW instruction. The new FCW value is compared to the selected virtual FCW by a comparator 132 and a flag ZF is generated depending on the comparison. In the example, the ZF flag is set to "1" if the NEW_FCW equals the virtual FCW. The ZF flag is set to "0" if the NEW_FCW is not equal to the virtual FCW. This ZF flag is used to determine if the NEW_FCW value needs to be loaded. If the NEW_FCW value matches the selected virtual FCW value then the existing loaded virtual FCW value is utilized and the NEW_FCW is ignored. If the comparison does not result in a match, then the NEW_FCW value is loaded into the appropriate registers 110 or 111, as well as register 112. As noted above, the color bit is flipped each time a new FLDCW instruction is encountered, so that the NEW_FCW value being loaded is compared against the previous to last FCW value loaded into the physical FCW registers.

It is to be noted that in loading the physical registers 110–112 initially, as described above, the FLDCW instruction follows the same procedure in checking the NEW_FCW to the loaded values. However, at initial loading the NEW_FCW will not match the loaded values, so a load is performed to load the registers 110–112. Similarly, when executing the FLDCW instruction, if the FCW_OTHER bits in the register 101 do not match the value in the register 112 (even if the PC/RC bits match), the instruction will cause the new FCW to be loaded.

As noted in FIG. 2, if ZF equals 1 (denoting a match), a value identical to the NEW_FCW value is already present in the physical registers of the respective color, so that the instruction will not reload the physical register. If ZF is zero (denoting a non-match), then the new FCW is loaded into the physical registers. It is to be noted that the comparison is performed for the $FCW_x$ register of the appropriate color and the register 112.

As an example, if a first FCW and a second FCW being loaded have different PC/RC values, but the same FCW_OTHER value, then a third FCW which is identical to the first FCW will be ignored due to ZF being equal to 1 when the third FCW is compared to the virtual FCW by comparator 132. Note that the third FCW would not be compared to the second FCW since the colors would not match. If the third FCW does not match the first loaded FCW, then the loading instruction would be completed, in which the third FCW would be loaded into the appropriate register 110 or 111 and also into register 112.

Figure 3:
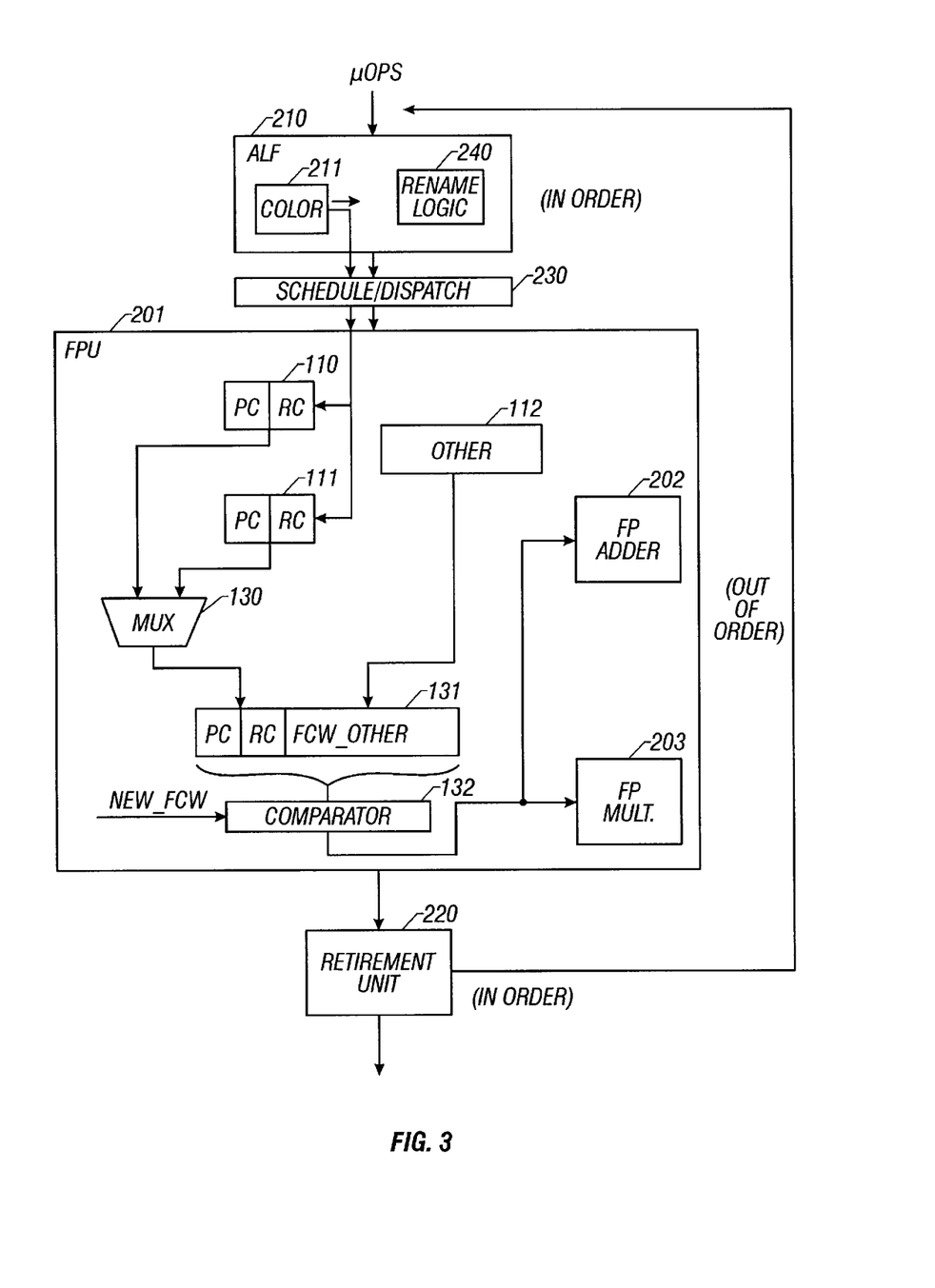
FIG. 3 is a block diagram showing the flow of a $\mu$op through a floating point unit in which each $\mu$op is assigned a color bit to determine which of the renamed FCW registers controls its operation.
Figure 4:
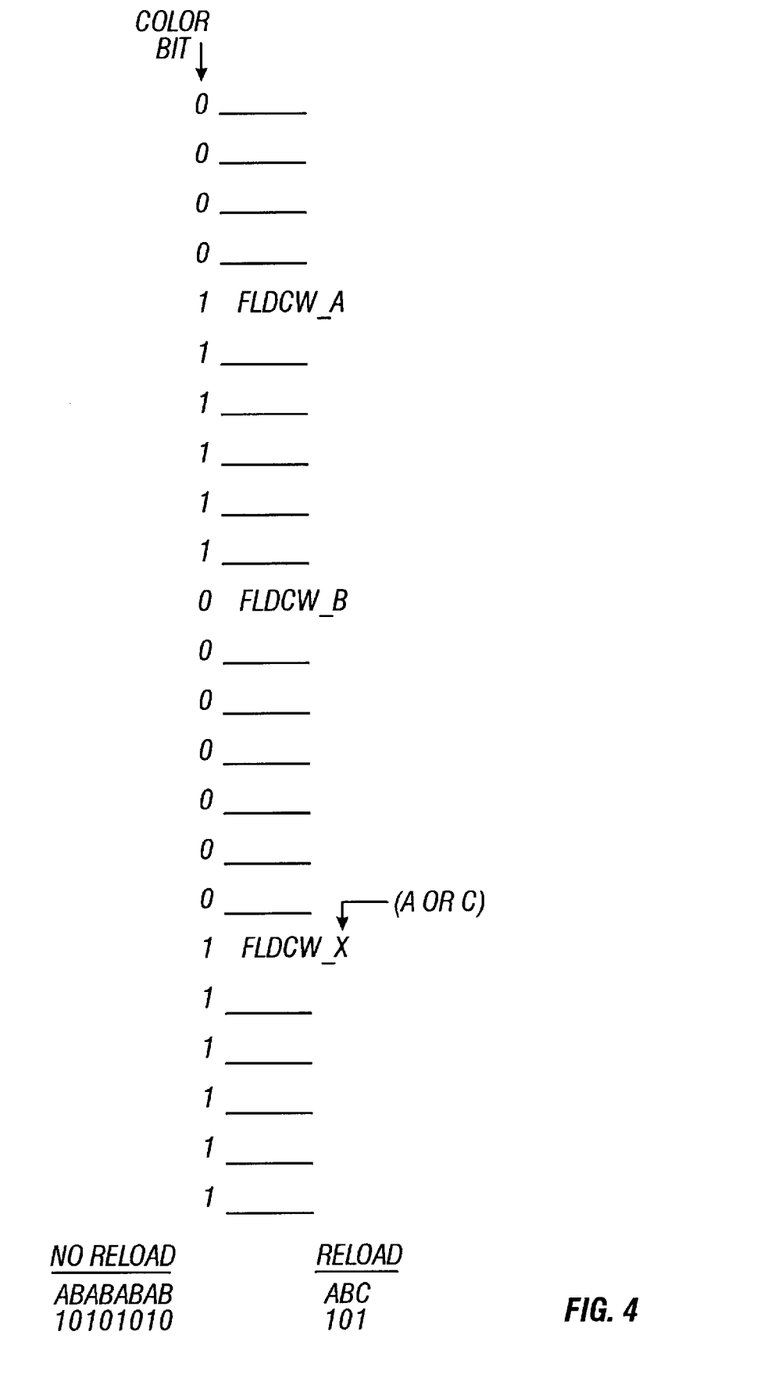
FIG. 4 illustrates a sequence of $\mu$ops having a color bit assigned and in which the color bit is flipped at each loading of the FCW register.

Referring to FIGS. 3 and 4, a more detailed operation of the embodiment are shown. In FIG. 3, a floating point unit (FPU) 201 comprises various units for performing floating point operations. These units typically include a floating point adder 202 and a floating point multiplier 203. It is appreciated that other units not shown are also included within FPU 201 for performing various floating point operations. Also included within FPU 201 are the renamed FCW registers 110–112, as well as mux 130 and comparator 132.

In the particular embodiment shown in FIG. 3, an Allocation and Freelist Manager unit (ALF) 210 is shown coupled to the schedule/dispatch logic 230 unit and then to the FPU 201. One of the tasks of the ALF 210 is to perform various register renaming, including the renaming of the FCW register. Thus, the ALF 210 includes a rename logic 240 unit (which could also include a register alias table), to perform the renaming of logical registers, including the FCW register. The ALF 210 also includes a color logic 211 unit for assigning a particular color to each of the μops when an instruction is decoded. The color logic unit 211 operates as a selection unit to utilize the color to select a corresponding physical control word register. The ALF 210 also allocates μops of the decoded instruction and the μops are scheduled and dispatched by a schedule/dispatch logic 230 unit. At this stage, the μops are in programming order for execution by the FPU 201. The μops are assigned a particular color by the ALF 210 before proceeding to the FPU 201. A color bit is assigned to each μop to identify which FCW is to be used. The assignment of the color for FCW identification is illustrated in FIG. 4.

In FIG. 4, the color bit is shown associated with each μop allocated by the ALF 210. The color bit assignment by the color unit 211 does not change until an FLDCW instruction is encountered in the program. In the example of FIG. 4, an instruction FLDCW_A (denoting an FLDCW instruction which will load an FCW value of A) causes the color bit to be flipped and loaded into the renamed FCW register corresponding to the color bit. In the example, this color bit has a value of "1". The color unit 211 assigns the color bit the value of "1" to the FLDCW_A and all subsequent instructions. When the next FLDCW instruction is encountered (in this example FLDCW_B), this instruction causes an FCW value of B to be loaded into the renamed FCW register corresponding to the color bit value of "0". All subsequent μops are now assigned the color of "0". Subsequently, when the next FLDCW instruction is received, the color bit will again be flipped so those hops following this instruction will be assigned a color bit value of "1".

The third FLDCW instruction shown in FIG. 4 loads a FCW value of "X". In the example programming sequence, the third FLDCW instruction could be reloading the first FCW value (FCW_A) or it could be loading some other value other than FCW_A. In this example, a value FCW_C is used to denote a value other than FCW_A. If the value being loaded is C, then a new FCW value will need to be loaded to the respective physical register(s). However, if the third FLDCW instruction is for the purpose of reloading the first FCW value (which is FCW_A) then a reload of this value is unnecessary since the same value already exists in the renamed FCW register having the color of "1". Reloading of the renamed FCW register with the FCW_A value is unnecessary so that a short-cut can be taken in executing the instruction (since reloading is not needed).

The described sequence of converting data from floating point format to integer format fits the profile described above. That is, FLDCW_A will load a floating point control word for performing various floating point instructions. At some point, floating point to integer conversion is required to perform an integer operation. Thus, FLDCW_B will load PC and RC bits corresponding to integer operation into the renamed FCW register of the other color. Subsequently, a third FLDCW instruction can then be utilized to return to the original floating point mode. Since the original FCW is still resident in the first renamed register, this new value does not need to be reloaded into the FPU 201. However, if the third FCW value is not the original value A, then this value (denoted as "C") will need to be loaded into the appropriately "colored" register.

In FIG. 4, a condition where no reloading of the FCW registers is shown as ABABABAB. After loading the control word values A and B, if subsequent FLDCW loads require the AB sequence to be repeated, then no reloading of AB is required. The sequence of FP-INT-FP-INT-FP-INT will follow this sequence. However, a loading of a new value, shown as C in the load sequence ABC, will require this new FCW value to be loaded.

Figure 5:
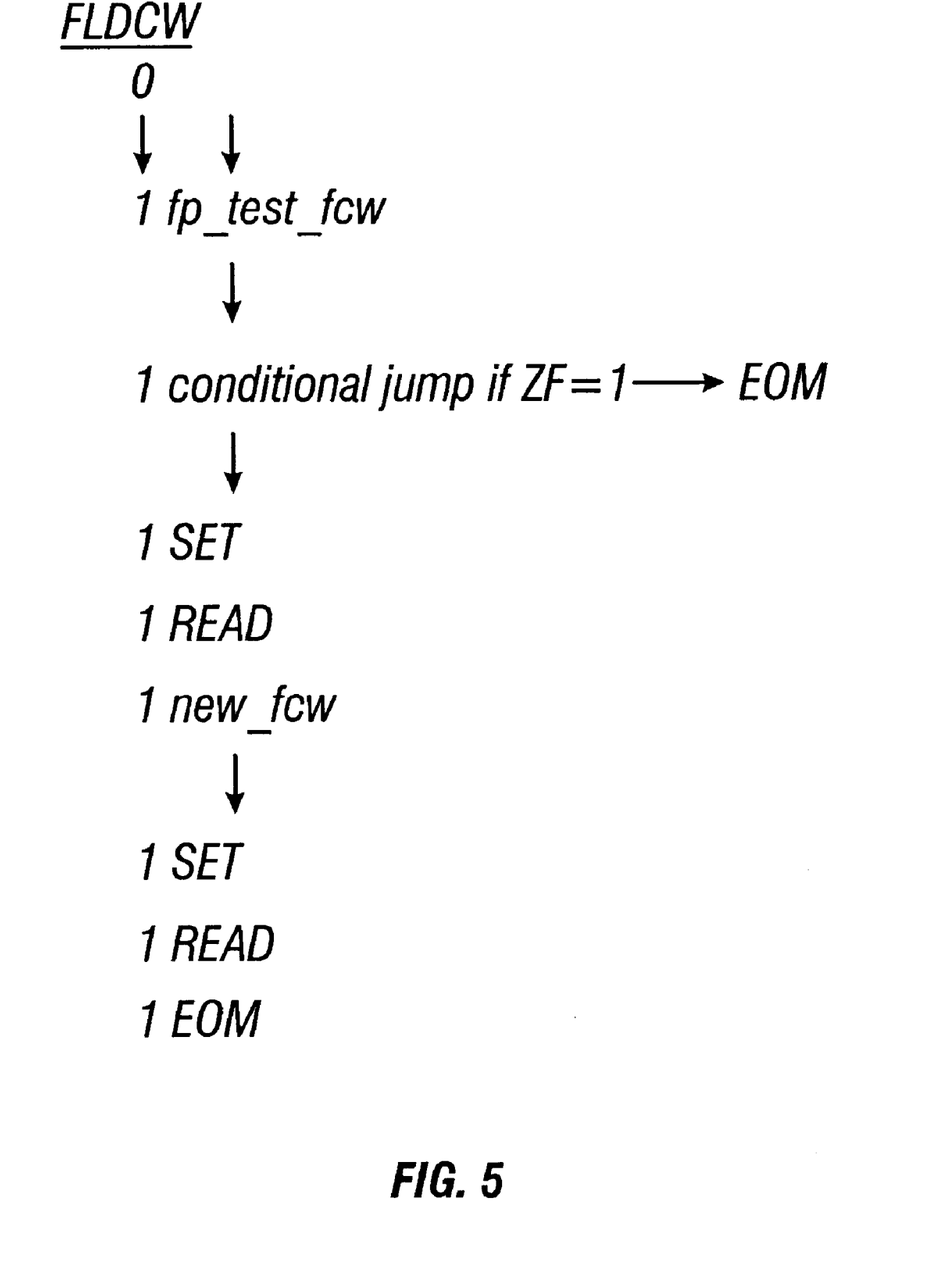
FIG. 5 illustrates Hops for performing the load FCW register operation in which a test $\mu$op is provided to determine if the new FCW is already present in the renamed register.

Referring to FIG. 5, an example sequence of μops pertaining to the FLDCW instruction is shown. It is appreciated that the loading of the FCW can be implemented in a variety of ways. In the example, after execution of one or more μops, whose function is not dependent on the color, a fp_test_fcw μop is encountered. The fp_test_fcw μop causes the color unit 211 to flip so that the color bit assigned to it and subsequent μops will have the new color value.

In the example of FIG. 5, the color bit changes from "0" to "1". This color bit now selects the corresponding PC/RC bits from either register 110 or 111 through mux 130 (shown in FIGS. 2 and 3). The subsequent μops cause the selected virtual FCW value 131 to be compared to the NEW_FCW, whose location is identified in the FLDCW instruction. The comparison in the comparator 132 generates the ZF flag. If the ZF flag has a "1", a conditional jump is made to reach the end of the macroinstruction (EOM) to complete the FLDCW instruction. Thus, when the FLDCW instruction is to reload a value that is already present in the rename register of the corresponding color, a conditional jump is effected to end the FLDCW instruction and the current value in the rename register is utilized. However, if the ZF value denotes that the virtual FCW and the NEW_FCW are not equal, then after setting and reading a scoreboard, the NEW_FCW value is loaded into the renamed register associated with the corresponding color (which in this example has the color of "1"). Thus, in the example of FIG. 4, if the third FLDCW instruction attempts to load the value which is other than "A", the new FCW values (NEW_FCW) will be loaded into the color appropriate renamed register.

It is to be noted that the "scoreboarding" essentially involves a serialization technique in which the machine guarantees that consumers of μops of the current control word are completed before the new control word change takes effect for consumers of μops of the new control word. In superscalar machines utilizing pipelining, the practice of the present invention allows speculative operations to be performed in regards to the new control word. The prediction is based on the new control word being the same as the one in the FCW already, with the same color. If there is a match (ZF=1) then the conditional branch is effected to end the FLDCW instruction, as noted above. If there is no match (ZF=0), then the microcode routine tests the now value with the old value. If the values are equal, no attempt is made to load the value. If different, then microcode loads the new value. Generally, the prediction recovery initiates the serialization sequence to clear out the μops dependent on the existing control word, before and after the new control word is loaded. It is appreciated that in one embodiment, the pipeline need not be stalled, due to the use of speculative operations.

Referring to FIG. 3, the use of the renamed FCW registers allow µops to be executed out of order in the FPU 201. Since a color bit is assigned to each µop, the µop can then use the color bit to select the appropriate FCW for its operation. As long as only two control words are being utilized at any given time, the out of order execution can be achieved simply by using the color bit of the µop to select the appropriate renamed physical FCW registers. Eventually, the µops are retired by the retirement logic 220 which places the hops back in programming order. Thus, two separate sets of µops, each set dependent on a particular FCW, can be operated out of order in the FPU 201.

When encountering subsequent FLDCW instructions in the program, the new FCW value is checked against the renamed FCW register value of the same color to determine if this new value is already present. If it is, then the short cut version of the instruction is used and the original FCW value already resident in the FPU 201 can be utilized without serialization. Since each FLDCW instruction flips the color bit, the µops following the color bit flip will also have the same color.

As noted earlier, the sequence of FCW loads having alternating sequence of loading FCW_A and FCW_B control words (resulting in the alternating sequence of ABABAB logical FCW values being loaded), results in a series of FCW instructions being completed without serialization (and scoreboarding). Thus, the subsequent FCW_A and FCW_B loads are completed without stalling the process for serialization. Again, the transitioning from floating point mode to integer mode, as well as back to the floating point mode, and repeating this sequence, is an example of how the invention saves processor time by not requiring serialization, when the FCW register(s) is/are reloaded with the same value(s) already present,. Thus, as long as this sequence is followed, the FLDCW instruction will be completed earlier without delay. The practice of the invention allows additional delay time, incurred due to stalls caused by serialization, to be bypassed. Machine (processor) performance is enhanced.

It is appreciated that the embodiment described above utilizes the renaming for only the PC/RC bits, since it is these bits which are changing when transitioning from FP to INT (as well as back to FP mode again). Generally, only the PC and RC bits are used to change the rounding and precision for FP-INT or INT-FP mode transitions. The remaining bits (FCW_OTHER) remain the same. Also as noted previously, the reason for having this configuration is for the purpose of conserving real estate space on an integrated circuit chip. This process is repeated throughout a programming cycle of the floating point unit. Thus, as the programming instructions require continued conversion from floating point mode to integer mode and back to floating point mode again, which is especially true with legacy code programming in the Intel Architecture Family of Processors, the manner in which the renamed FCW registers provide for the different PC/RC values enhance the speed of the FPU. It is also to be noted that only two renamed $FCW_x$ registers are used, since the FP-INT-FP (or alternately INT-FP-INT) transitions require an alternating sequence.

It is to be noted that in the prior art, each time the FLDCW instruction is executed, the processor is stalled until the existing set of µops are retired (to perform the serialization), before the new FCW can be loaded into the FCW register. With the present invention, as long as the new FCW value corresponds to an FCW value already stored in the FPU, the FLDCW operation need not reload the physical FCW register with a value that is already present.

In an alternate embodiment, two complete physical FCW registers could be utilized. In the instance FCW_OTHER bits may change along with the PC/RC bits, two complete renamed FCW registers (instead of three partial registers) can be provided for storing two complete FCW values. As shown in FIG. 6, two complete physical FCW registers 301 and 302 can be utilized, still under control of the selection (color) bit 120. This arrangement allows for each FCW register 301 or 302 to store different FCW_OTHER bits as well, so that invention can be practiced without being limited to having the same FCW_OTHER bits.

Figure 7:
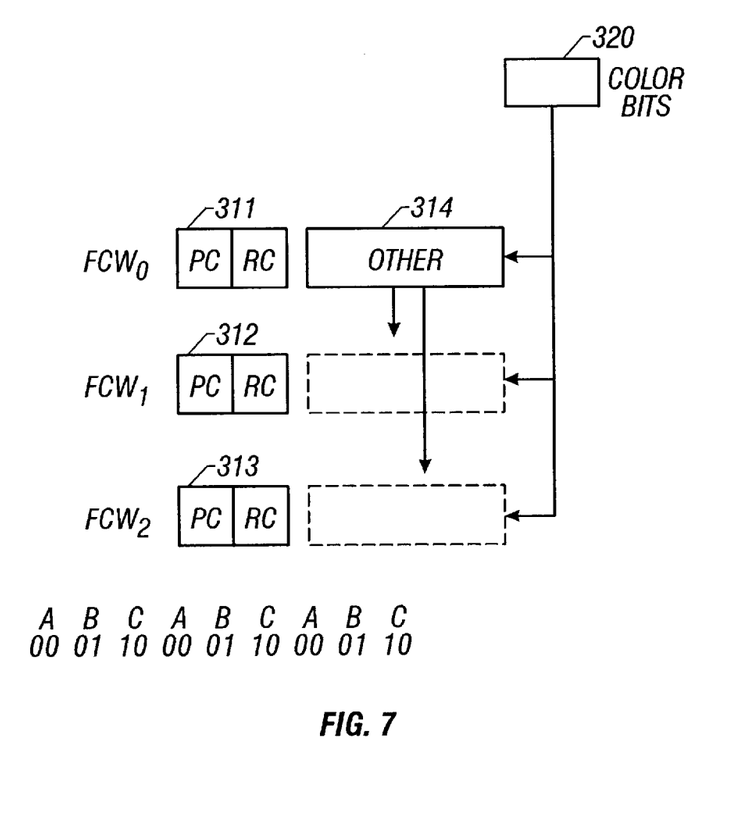
FIG. 7 illustrates an alternative embodiment in which three renamed physical FCW registers are provided.

Furthermore, it is appreciated that the number of FCW registers for renaming purpose can be increased beyond two. For example, in FIG. 7, the three renamed FCW registers (shown as $FCW_0$, $FCW_1$, $FCW_2$) are utilized in which the selection is provided by two bits. In this example, separate registers 311–313 are provided for the PC and RC bits and only one register 314 is provided for the FCW_OTHER bits. Again, three full registers could be utilized as well. Two color bits are then utilized to select among the three sets of PC/RC values. In this instance, the earlier described mux 130 would be designed to select one output among the three registers 311–313 under the control of the two selection (color) bits 320.

In operation, instead of just flipping a single bit, the two bits would cycle through three values so that as each FLDCW instruction is loaded, the color bits would change to the next bit value in the sequence. The embodiment shown in FIG. 7 would be utilized in the instance where the FPU control word experiences a three-state transition sequence, which is shown as ABC ABC ABC in FIG. 7. In this instance, this three-state transition sequence would not require the reloading of the physical FCW registers, so that the serialization process is bypassed.

It is to be noted that other transition sequences can be readily implemented without departing from the spirit and scope of the invention. As to how many color states to have for renaming in a processor, it will depend on the prevalent number of repeating events (whether it is two for the ABABAB sequence, three for the ABCABCABC sequence, or some other sequence cycle) encountered in the programming. Choosing: the renaming to handle the most encountered repeating sequence allows further enhancement in saving time in reloading FCW values. This is in addition to saving processing time by having two (or more) FCW values available for use at the same time, allowing for µops which depend on different FCW values to run at the same time without reloading the FCW register.

Figure 8:
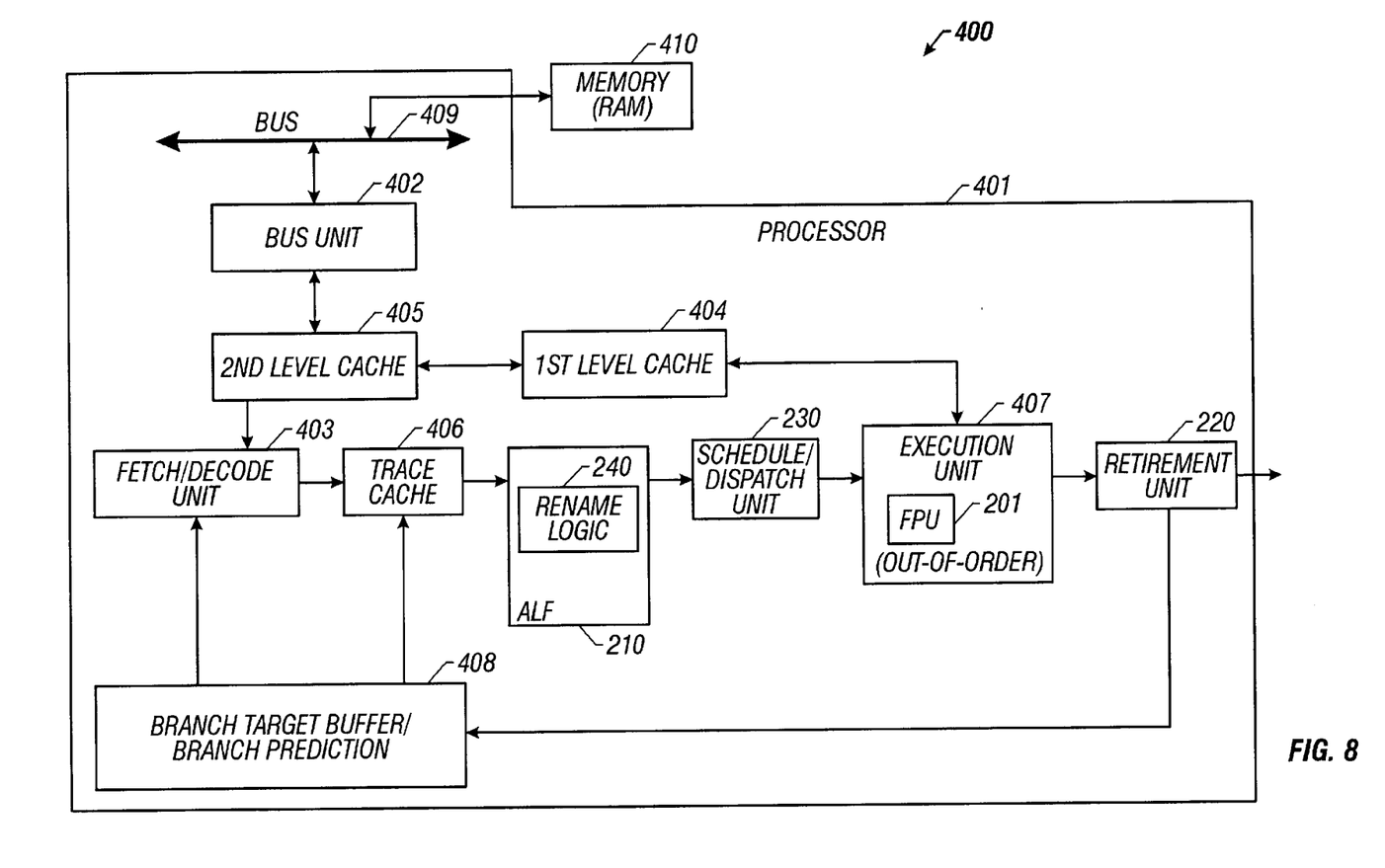
FIG. 8 is an example block diagram of a computer system having a processor which includes the renamed FCW registers.

Referring to FIG. 8, one typical system embodiment for practicing the invention is shown. A computer 400 is shown in which a processor 401 functions as a sole or one of a plurality of processors comprising a central processing unit (CPU) or units of a computer 400. Typically the processor 401 is embodied in a single integrated circuit chip. The processor 401 includes various units, including a bus unit 402, fetch/decode unit 403, cache memories 404–406, ALF 210, scheduling/dispatch unit 230, execution unit 407 (which includes FPU 201), retirement unit 220 and a branch target buffer/branch prediction unit 408.

One or more buses (shown here simply as a single bus 409) are coupled to the bus unit 402 for coupling the processor to various other devices. As an example, a memory 410 is shown coupled to the bus 409 in FIG. 8. The second level cache 405 is coupled to the bus unit 402, in which data and instructions stored in the memory 410 are cached at this level. The instructions are coupled to the fetch/decode unit 403 (for fetching and decoding) and μops of the decoded instructions are cached in the trace cache 406. The data are also cached in the first level cache 404 and used by the execution unit 407. The ALF 210 allocates μops and rename the various registers (by use of rename logic 240), as previously described above.

The execution unit 407 generally includes integer and floating point execution units and performs out-of-order operations on the hops, based on the out-of-order protocol or consistency utilized for the processor 401. The execution unit 407 is coupled to the retirement unit 220 for retiring the μops in order. The retirement unit 220 is coupled back to a branch target buffer/branch prediction unit 408 for handling the speculative operations of the superscalar processor. Generally, unit 408 is coupled to units 403 and 406 to accept or not accept branch operations, which are typically done speculatively.

The earlier described renamed FCW registers are present within the FPU 201. The programming instructions are typically resident in memory 410 (as well as in the caches) and fetched and decoded by fetch/decode unit 403. Once the instruction is decoded, the μops are allocated by the ALF 210, which also assigns the μops with the appropriate color as previously described. The execution unit 407, including the FPU 201, executes the μops pursuant to the embodiments of the invention earlier described. Subsequently, when the μops are retired, the result is obtained from the retirement unit 220, and if necessary, the result is sent out on the bus 409 to devices, such as the memory 410. It is appreciated that the computer system 400 shown in FIG. 8 is but one representative computer system for performing operations implementing the present invention.

Thus, "Control Word Register Renaming" is described. It is to be noted that although the embodiment described above pertains to a floating point control word and loading values into floating point control word registers, the invention can be practiced with other types of control words as well. Furthermore, a control word, or values equivalent to a control word, may be present in a different format. For example, such controlling values can reside as part of a word in a register (thus, only a portion of the word in the register may be applicable for use as a controlling value), so that the register as a whole is not necessarily dedicated to store a complete control word. However, the portion that does apply to the control function in such a register can be adapted to practice the invention.

We claim:

1. An apparatus comprising:
   a plurality of physical control word registers, one of the physical control word registers being flagged when a state of the physical control word register corresponds to a state of an instruction in logical control word register;
   a rename logic coupled to rename the logical control word register's values to each of said physical control word registers in response to a plurality of instructions, each specifying a plurality of logical control word register values; and
   a selection unit coupled to the plurality of physical control word registers and the logical control word register to compare a new value in the logical control word register to an existing value in the flagged physical control word register and to replace the existing value in the flagged physical control word register with the new value if the values differ.

2. The apparatus of claim 1 wherein the state is determined by a state of a bit or bits assigned to each physical control word register.

3. The apparatus of claim 1 wherein said rename logic compares a new value, which is to be loaded into a selected physical control word register, to a value already present in the selected control word register; and if the new value to be loaded is already present, said rename logic allows completion of the instruction without serialization.

4. The apparatus of claim 1 wherein said physical control word registers are configured to have a plurality of physical registers for portion of a data, but one physical register for remaining portion of the data.

5. A processor comprising:
   a first physical control word register;
   a second physical control word register, one of the first physical control word register and second control word register being flagged when a state of one of the physical control word registers corresponds to a state of an instruction in a logical control word register;
   a rename logic coupled to rename the logical control word register's values to each of said physical control word registers in response to a plurality of instructions, each instruction specifying a plurality of logical control word register values; and
   a selection unit coupled to the physical control word registers and the logical control word register to compare a new value in the logical control word register to an existing value in the flagged physical control word register and to replace the existing value in flagged physical control word register with the new value if the values differ.

6. The processor of claim 5 wherein the color state changes to select a next physical control word register to load a control word in response to an instruction to load the logical control word register.

7. The processor of claim 6 wherein said rename logic compares a new value, which is to be loaded into the next physical control word register, to a value already present in the next physical control word register; and if the new value to be loaded is already present, said rename logic allows completion of the instruction without serialization.

8. The processor of claim 7 wherein said first and second physical control word registers are configured to hold only a portion of a respective data which is to be renamed and a common register to hold remaining portion of the data.

9. The processor of claim 7 wherein said physical control word registers hold floating point control words.

10. A processor comprising:
    a first physical floating point control word register;
    a second physical floating point control word register, one of the physical floating point control word registers being flagged when a state of one of the physical floating point control word registers corresponds to a state of an instruction in a logical floating point control word register;
    a rename logic coupled to rename the logical floating point control word register's values to each of said physical floating point control word registers in response to a plurality of instructions, each instruction specifying a plurality of logical floating point control word register values; and
    a selection unit coupled to the plurality of physical floating point control word registers and the logical floating point control word register to compare a new value in the logical floating point control word register to an existing value in the flagged physical floating point control word register and to replace the existing value in the flagged physical floating point control word register with the new value if the values differ.

11. The processor of claim 10 wherein the color state sequences to a next color state of a sequence when an instruction to load a floating point control word is encountered in a program to select a next physical floating point control word register to load the floating point control word.

12. The processor of claim 11 wherein said rename logic compares a new floating point control word value assigned a particular color, which is to be loaded into the physical floating point control word register of that same color, to a floating point control word value already present in the physical floating point control word register of that same color; and if the new floating point control word value matches the floating point control word value present in the floating point control word register of that color, said rename logic allows completion of the instruction without serialization.

13. The processor of claim 12 wherein said first and second physical floating point control word registers are configured to hold only a portion of a respective floating point control value which is to be renamed and a common floating point control word register to hold remaining portion of the floating point control value.

14. The processor of claim 13 wherein the portion of the respective floating point control word which is renamed comprises bits used to control rounding and precision in a floating point unit.

15. The processor of claim 10 wherein said first and second physical floating point control word registers are configured to hold only a portion of a respective floating point control value which is to be renamed and a third floating point control word register to hold a common portion of the floating point control value; and the portion of the respective floating point control word which is renamed comprises bits used to control rounding and precision in a floating point unit.

16. A computer system comprising:
   a memory;
   a processor coupled to said memory comprising:
      a first physical control word register;
      a second physical control word register, one of the first physical control word register and second control word register being flagged when a state of one of the physical control word registers corresponds to a state of an instruction in a logical control word register;
   a rename logic coupled to rename the logical control word register's values to each of said physical control word registers in response to a plurality of instructions, each instruction specifying a plurality of logical control word register values; and
   a selection unit coupled to the physical control word registers and the logical control word register to compare a new value in the logical control word register to a existing value in the flagged physical control word register and to replace the existing value in the flagged physical control word register with the new value if the values differ.

17. The computer system of claim 16 wherein the color state changes to select a next physical control word register to load a value in response to an instruction to load the logical register.

18. The computer system of claim 17 wherein said rename logic compares a new value, which is to be loaded into the next physical control word register, to a value already present in the next physical control word register; and if the new value to be loaded is already present, said rename logic allows completion of the instruction without serialization.

19. The computer system of claim 18 wherein said first and second physical control word registers are configured to hold only a portion of a respective data which is to be renamed and a common control word register to hold remaining portion of the data.

20. The computer system of claim 18 wherein said physical control word registers hold floating point control words.

21. A method comprising:
   executing a first instruction which loads a first value into a logical control word register;
   renaming the logical control word register specified by the first instruction to a first physical control word register one of a plurality of physical control word registers;
   loading the first value into the renamed first physical control register;
   executing a second instruction which loads a second value into a logical control word register;
   renaming the logical control register specified by the second instruction to a second physical control word register of the plurality of physical control word registers;
   loading the second value into the renamed second physical control register;
   executing a third instruction which loads a third value into a logical control word register;
   comparing the third value to one of the first value and the second value to determine whether the third value is different than the one of the first value and the second value; and
   loading the third value into the physical control word register containing the one of the first value and the second value if the third value is different.

22. The method of claim 21 further including assigning a color state to each physical control word register and a respective color state to machine instructions which derive control from data stored in the respective physical control word register; and selecting corresponding data by matching color states of the machine instructions to the color states of the physical control word registers.

23. The method of claim 22 wherein said assigning the color state is achieved by using a bit or bits assigned for color in each physical control word register.

24. The method of claim 21 further including executing a second instruction which loads a new value into the renamed physical control word register, but if the new value to be loaded is already present, the second instruction is completed without undergoing serialization and without loading the new value.

25. The method of claim 21 wherein the renaming the control word register is performed on a floating point control word register.

26. The method of claim 21 wherein the renaming the control word register is performed on only a portion of the value.

* * * * *

UNITED STATES PATENT AND TRADEMARK OFFICE
CERTIFICATE OF CORRECTION

PATENT NO. : 6,779,103 B1
DATED : August 17, 2004
INVENTOR(S) : Alexander, III et al.

It is certified that error appears in the above-identified patent and that said Letters Patent is hereby corrected as shown below:

Column 1,
Line 49, delete "pops" and insert -- $\mu$ops --.

Column 2,
Line 2, delete "pops" and insert -- $\mu$ops --.
Line 21, delete "Hops" and insert -- $\mu$ops --.

Column 5,
Line 43, delete "hops" and insert -- $\mu$ops --.

Column 7,
Line 9, delete "hops" and insert -- $\mu$ops --.

Column 9,
Line 8, delete "hops" and insert -- $\mu$ops --.

Column 11,
Line 53, delete "a" and insert -- an --.

Column 12,
Line 18, delete "one".
Line 24, after "control", insert -- word --.

Signed and Sealed this

Fourteenth Day of December, 2004

JON W. DUDAS
*Director of the United States Patent and Trademark Office*